Feb. 23, 1960
G. A. HEMPEL
2,925,989
SPOUTED GATE VALVE
Filed June 13, 1955
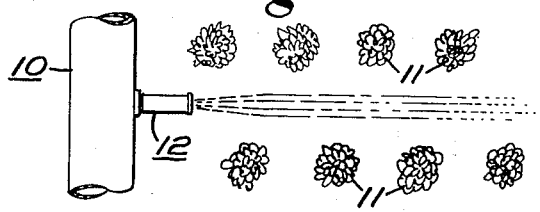
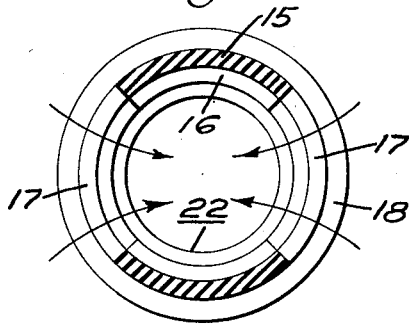
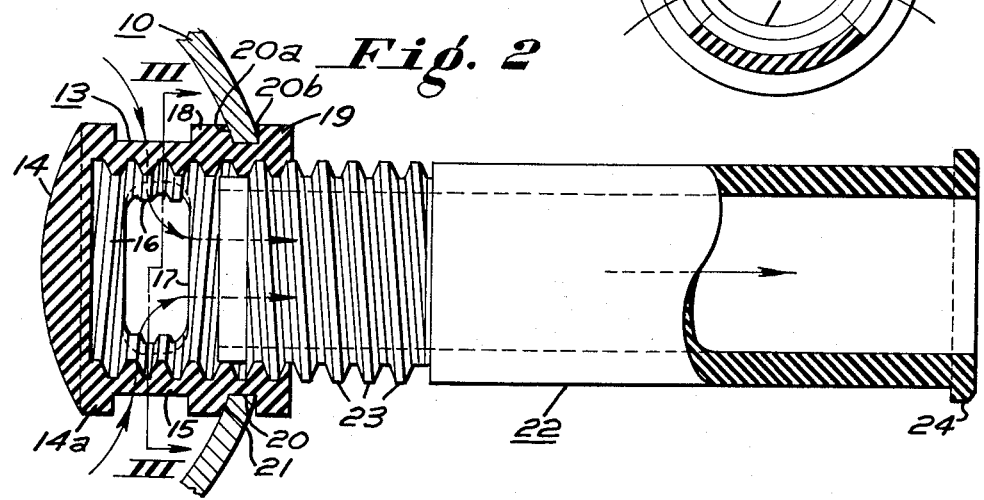
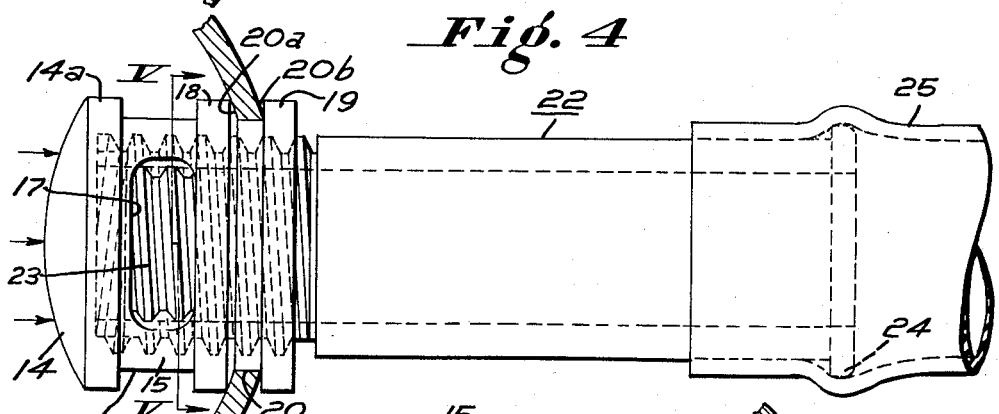
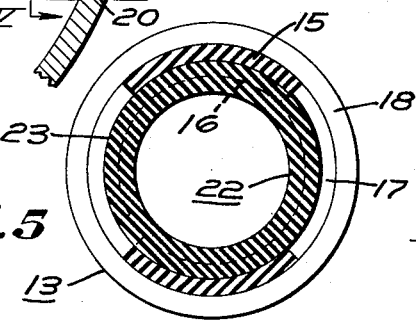
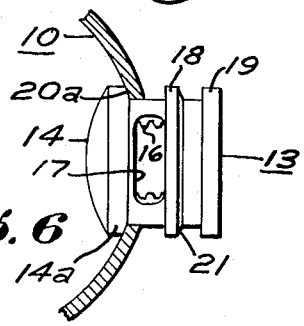

United States Patent Office 2,925,989
Patented Feb. 23, 1960

2,925,989

SPOUTED GATE VALVE

Gustav A. Hempel, Pittsburgh, Pa., assignor to McDowell Manufacturing Company, Pittsburgh, Pa., a corporation of Pennsylvania Application June 13, 1955, Serial No. 514,853

3 Claims. (Cl. 251—145)

This invention relates to a gate valve and particularly to one in which the gate may act also as a spout and as a fine adjustable control for supplying liquids from a housing or pipe member such as may be used in irrigating crop rows.

In irrigating crop rows, a length of pipe is laid transversely of a series of longitudinally-extending row plantings which have a suitable transverse spacing with respect to each other. The tubing or pipe line is provided with fluid feed or discharge openings, usually of about 40 inch spacing, in alignment with the spacing between the crop rows to supply irrigating water therealong. Means is provided, such as a valve unit, for controlling and shutting off fluid flow from each of the discharge openings that are usually horizontally positioned in the side wall of the pipe line. In this manner, the amount of water supplied may be proportioned to actual requirements from the standpoint of the nature of the crop, the depth of its roots, and the like, and from the standpoint of the type and intensity of irrigating action desired.

Valve units heretofore used for this purpose have not been entirely satisfactory. In the first place, difficulty has been encountered in inserting and mounting the valve units through openings in the side wall of a tubing housing member or pipe section. In the second place, valve units heretofore used have been of a type such that they are subject to damage when the pipe section is transported or removed from one place to another. In the third place, difficulty has been encountered in fully shutting-off the valves and in operating them due to silt or dirt jamming.

In my Patent No. 2,693,203 which issued November 2, 1954, I have described and claimed a gated valve that obviates the above difficulties. In one form, the gated valve of this patent includes a cup-shaped body having a passageway extending along one side and adapted to be stationed within a wall opening of a fluid-carrying member between positions of minimum and maximum insertions. In the position of minimum insertion, the passageway of the cup-shaped body is stationed outside of the fluid-carrying member so that the valve is shut. As the cup-shaped body is inserted farther into the fluid-carrying member, the passageway along a side of the body enters the housing member and conducts fluid therefrom through the passageway and out the open end of the cup-shaped body. Still further insertion of this body increases the effective flow area of the passageway as it passes the wall opening and therefore likewise increases the rate of fluid flow therethrough until substantially the position of maximum insertion is reached.

Although this valve is satisfactory for the purposes indicated, the fluid seal between the edges of the wall opening in the fluid-carrying housing member and the exterior of the cup-shaped body intermediate the positions of minimum and maximum insertion has been found to be not as tight as the seal between such wall edges and the cup-shaped body at the extreme positions mentioned. Further, since the actual insertion and positioning of the valve body with respect to the wall opening is by hand, the control of the effective flow area of the passageway and the resultant control of the rate of fluid flow is necessarily relatively coarse. Additionally, the gated valve of my indicated patent is not readily connected to a hose exteriorly of the housing member, as when it is desired to conduct fluid from the housing member for some distance prior to its distribution at a point of use. Still further, the valve of this patent has substantially only one shut-off position.

The gated valve of my present invention similarly overcomes the difficulties met with the valves in use prior to my Patent No. 2,693,203, and in addition, provides further advantages. My instant valve provides a tight fluid seal at all times with the wall opening in the fluid-carrying member and is capable of a much finer control on the rate of fluid flow. Moreover, a portion of the gate member is readily adapted for detachable connection to another conductor, such as a flexible hose, when it is desired to conduct the fluid for some distance away from the housing member. In addition, the gate of the valve may actually be removed when desired and the valve body shifted to a second shut-off position with respect to the fluid-carrying member.

In my instant gated valve, the cup-shaped body need not be moved longitudinally with respect to an open wall portion of a fluid-carrying member to adjust an effective flow area. Instead, such body is fixed with respect to the fluid-carrying member, and a tubular member is mounted within the cup-shaped body for relative movement therewith to cover and uncover a side passageway or opening in the body. The tubular member also acts as a spout and may, if desired, be entirely removed from the valve body. In this case, the valve body is pulled outwardly to a second shut-off position.

In my copending applications, Serial Numbers 514,854 and 514,855, filed June 13, 1955, I have described and claimed two other forms of my improved gated valve. The instant valve differs from those of the copending applications in that preferably the gate or sleeve has both relative axial and rotary movement with respect to the valve body. For example, in one form, the tubular member is adapted for both rotary and axial movement with respect to the cup-shaped body to cover and uncover the passageway with a very fine degree of control. This form includes an internally threaded cup-shaped body having an opening or passageway in one side. Flexible means on the body between the side opening and the open end of the cup-shaped body engages a periphery of an open wall portion of a fluid-carrying housing member to seal off fluid flow between such member and the body. An externally threaded tubular member or sleeve engages the internal threads of the cup-shaped body to effect rotary and axial movement therebetween and to cover and uncover the side opening to a desired extent. In the preferred form, the sleeve extends outwardly beyond the open outer end of the cup-shaped body to act also as a spout. When for convenience or safety, it is desired to remove the spout or sleeve, the latter may be readily unscrewed and the cup-shaped body shifted to a second shut-off position. To reach this position, the body is pulled outwardly from the housing member, and additional flexible means adjacent the closed end of the cup-shaped body engages a periphery of an open wall portion as before, to seal off fluid flow between the body and the open wall portion.

The accompanying drawing illustrates a presently preferred embodiment wherein:

Figure 1 is a diagrammatic plan view of a crop row system illustrating how a valve of my invention may be employed;

Figure 2 is a central, longitudinal section of the valve of Figure 1 in a fully opened position;

Figure 3 is a section of Figure 2 on the line III—III;

Figure 4 is a section similar to Figure 2 showing the valve in a fully closed position and a hose attached to a gate of the valve;

Figure 5 is a section of Figure 4 on the line V—V; and

Figure 6 is a side elevation of the valve showing a second shut-off position with the gate or sleeve removed.

Referring to the drawing, my valve may be used with a fluid-carrying housing member shown in Figure 1 as a pipe 10. The pipe lies transversely of crop rows 11 with the instant valve, generally shown at 12, extending preferably parallel to and between the rows to supply irrigating water.

The embodiment illustrated includes a cup-shaped body 13 formed from a relatively soft resilient material such as natural or synthetic rubber. The body 13 has a closed-off inner end 14 and a longitudinally extending side wall 15 terminating in an open outer end. The end 14 is preferably dome-shaped, as hereinafter described, and has a flexible, radially-extending sealing rib 14a. The wall 15 has internal threads 16 and opposite radial openings or passageways 17 adjacent its inner end. The threads are of a relatively wide pitch, for example, about four or five threads per inch. A pair of spaced-apart resilient sealing rims 18 and 19 extend radially outwardly from the cup-shaped body to engage inner and outer seating surfaces 20a and 20b, respectively, about wall edges 20 of an open wall portion in the pipe 10 and thereby seal off fluid flow between the wall edges and the cup-shaped body 13. As illustrated in Figures 2 and 4, the seal rims 18 and 19 preferably grip the peripheral seating surfaces 20a and 20b with respect to the cup-shaped body 13 at a point between the passageways 17 and the outer open end of that body. Preferably, the inner sealing rim 18 has a tapered side 21 shaped to conform with the configuration of the inner seating surface of the pipe 10.

A tubular member, body or sleeve 22 which functions, inter alia, as the gate of the valve has external threads 23, which mesh with the internal threads 16; this, in effect, provides an adjustable tongue and groove relationship. The body 22 also has an end flange 24. The sleeve may be metal, plastic, rubber, and the like. Preferably, it is a denser material than that composing the cup-shaped body 13. For example, when the sleeve 22 is rubber, it may have a durometer reading as high as 100 or higher, while the cup-shaped body 13 may have a durometer reading approximating 60 to 70.

In practice, the cup-shaped body, preferably while free of the sleeve 22, is manually collapsed, inserted at an angle through the wall opening defined by the edges 20 with the closed end 14 leading, and then squeezed and flexed until the rims 18 and 19 straddle the edges 20 as shown in Figure 2. The sleeve 22 is next screwed into the cup-shaped body until it covers the passageways 17 as illustrated in Figure 4. The valve is now fully closed. When pressure is admitted to the pipe 10, the dome-shaped area of the outside of the closed end 14 provides a fluid pressure area that is greater than the fluid pressure area of the planar inside surface of end 14 taken normal to the longitudinal axis of the body 13. The dome-shaped area is sensitive to fluid pressure because of its resilient nature, and accordingly moves the inner sealing rim 18 into a fluid-tight seating engagement with the inner seating surface 20a. In this manner, the dome-shaped end 14 and rim 18 cooperate to provide a fluid seal between the body 13 and the pipe 10 in response to fluid pressure within the pipe. The shaped side 21 of rim 18 aids in this seal.

To open the valve, it is necessary only to unscrew the sleeve 22 until the passageways 17 are at least partially uncovered. Because of the relative axial and rotary movement between the sleeve 22 and the body 13, a very fine degree of control is possible on the effective flow areas of the openings or passageways 17. This control may be even further increased by staggering the passageways 17 somewhat longitudinally with respect to the body 13. The sleeve 22 in acting as a spout prevents the water from running back along the pipe and can be readily gripped to control the flow without wetting the user. To remove the valve from the pipe 10, the parts may be withdrawn in an order reversed to their assembly.

When it is desired to carry water issuing from the valve 12 a distance from the pipe 10, such as to a trench rather than to discharge it immediately adjacent the pipe, a flexible hose 25 leading to a desired point of use is readily attached to the sleeve 22. Accordingly, the sleeve now acts as a spout in addition to functioning as the gate of the valve. The flange 24 grips the hose 25 upon its attachment.

It sometimes happens that it is desired to close the valve and yet remove the sleeve 22 to avoid damage thereto during periods of non-use. For example, the sleeve may become plugged from dirt, cut from adjacent stones and, particularly if made of metal, bent from inadvertent turning of the pipe 10 or upon moving the pipe from place to place. Even though the sleeve 22 acts as the gate of the valve, removal of this sleeve and closure of the valve is still possible with the instant structure. In such a case, the cup-shaped body 13 is moved outwardly until the resilient sealing rib 14a abuts the inner seating surface 20a as shown in Figure 6. The action of pressure against the dome-shaped end 14 aids this pressure seal in the same manner that it aids the seal of the inner sealing rim 18. The sleeve 22 may be readily unscrewed and removed before hand. Since, in Figure 6, the passageways 17 are effectively stationed on the outside of the pipe 10, there is no fluid flow through the cup-shaped body 13.

While the foregoing disclosure describes a presently preferred embodiment, it is understood that the invention may be practiced in other forms within the scope of the following claims.

I claim:

1. A gated valve to be flexed and inserted into a mounted position within a bounding wall portion of a side opening in a fluid-carrying member which comprises, a cylindrical cup-shaped body of resilient material having a cylindrical wall portion, an open outer end portion, a closed-off inner end wall, and openings formed in said cylindrical wall portion longitudinally-spaced-apart from the inner end wall for fluid-flow therethrough; a hollow tubular body having open end portions, said hollow tubular body being made of a material which is more rigid than said resilient cup-shaped body, said bodies being mounted in a telescopic relationship with each other and having interfitting tongue and groove portions to position the bodies relative to one another in pre-determined longitudinally-retained relationships with each other, one of said bodies having an outer peripheral groove and cooperating side rim portions of resilient construction to receive and seal-off the bounding wall portion of said opening in the fluid-carrying member, said tubular body having closed side wall portions adjacent its inner end longitudinally movable relative to said cylindrical cup-shaped body and transversely across the openings in the cylindrical wall portion of said cup-shaped body for positioning the tubular body into and out of fluid-flow registry with said openings, said closed side wall portions cooperating with said openings to open-up and seal-off fluid-flow through the valve independently of said closed-off inner end wall by selectively rotatably effecting longitudinal movement of said closed side wall portions transversely across said openings, while said closed side wall portions are spatially-disposed from said closed-off inner end wall, and said tubular body extending outwardly from said cup-shaped body to deliver fluid from the fluid-carrying member when said openings are in fluid-flow registry with said tubular body.

2. A gated valve to be flexed and inserted into a mounted position within a bounding wall portion of a side opening in a fluid-carrying member which comprises, a cylindrical cup-shaped body of resilient material having a cylindrical wall portion, an open outer end portion, a closed-off inner end wall, and openings formed in said cylindrical wall portion longitudinally space-apart from the inner end wall for fluid-flow therethrough; a hollow tubular body having open end portions, said hollow tubular body being made of a resilient material having a greater density than said cup-shaped body, said bodies being mounted in a telescopic relationship with each other and having interfitting relatively wide pitch threads of resilient construction to position the bodies relative to one another in pre-determined longitudinally retained relationships with each other, one of said bodies having an outer peripheral groove and cooperating side rim portions of resilient construction to receive and seal-off the bounding wall portion of the side opening in the fluid-carrying member, said tubular body having closed side wall portions adjacent its inner end longitudinally movable relative to said cylindrical cup-shaped body and transversely across the openings in the cylindrical wall portion of said cup-shaped body for positioning the tubular body into and out of fluid-flow registry and with said openings, said closed side wall portions cooperating with said openings to open-up and seal-off fluid-flow through the valve independently of said closed-off inner end wall by selectively rotatably effecting longitudinal movement of said closed side wall portions transversely across said openings while said closed side wall portions are spatially disposed from said closed-off inner end wall, and said tubular body extending outwardly from said cup-shaped body to deliver fluid from the fluid-carrying member when said openings are in fluid-flow registry with said tubular body.

3. A gated valve to be flexed and inserted into a mounted position within a bounding wall portion of a side opening in a fluid-carrying member which comprises, a cylindrical cup-shaped body of soft resilient material having a cylindrical wall portion, an open outer end portion, a closed-off inner end wall, and openings formed in said cylindrical wall portion lingitudinally spaced-apart from the inner end wall for fluid-flow therethrough; a hollow tubular body having open end portions, said hollow tubular body being made of a more rigid material than said cup-shaped body, said bodies being mounted in a telescopic relationship with each other and having interfitting tongue and groove portions to position the bodies relative to one another in pre-determined longitudinally-retained relationship with each other, said cup-shaped body having an outer peripheral groove and integrally formed cooperating side rim portions of resilient construction to receive and seal-off the bounding wall portion of the side opening in the fluid-carrying member, said inner end wall of said cup-shaped body extending radially across the cylindrical wall portion to provide a greater external than internal fluid pressure area to force at least one of said rim portions into fluid-tight sealing engagement with the bounding wall portion when fluid-flow through the valve is closed-off, said tubular body having closed side wall portions adjacent its inner end longitudinally movable relative to said cylindrical cup-shaped body and transversely across the openings in the cylindrical wall portion of said cup-shaped body for positioning the tubular body into and out of fluid-flow registry with said openings, said closed side wall portions cooperating with said openings to open-up and seal-off fluid-flow through the valve independently of said closed-off inner end wall by selectively rotatably effecting longitudinal movement of said closed side wall portions transversely across said openings, while said closed side wall portions are spatially-disposed from said closed-off inner end wall, and said tubular body extending outwardly from said cup-shaped body to deliver fluid from the fluid-carrying member when said openings are in fluid-flow registry with said tubular body.

References Cited in the file of this patent
UNITED STATES PATENTS

| | | |
|---|---|---|
| 225,298 | Newton | Mar. 9, 1880 |
| 297,000 | Paulus | Apr. 15, 1884 |
| 476,957 | Hale | June 14, 1892 |
| 812,627 | Wirth | Feb. 13, 1906 |
| 829,695 | Dennis | Aug. 28, 1906 |
| 1,296,239 | Van Meter | Mar. 4, 1919 |
| 1,525,517 | Smith | Feb. 10, 1925 |
| 1,579,567 | Schriner | Apr. 6, 1926 |
| 2,083,156 | McCabe | June 8, 1937 |
| 2,513,272 | Bowen | July 4, 1950 |
| 2,693,203 | Hempel | Nov. 2, 1954 |
| 2,697,582 | Grosch | Dec. 21, 1954 |
| 2,771,904 | Sherman | Nov. 27, 1956 |